May 8, 1951   K. C. HARLAN   2,551,739
SPRING CLUTCH AND ENERGIZING MEANS
Filed Feb. 3, 1950

INVENTOR.
KENNETH C. HARLAN
BY
ATTORNEY

Patented May 8, 1951

2,551,739

UNITED STATES PATENT OFFICE 2,551,739

SPRING CLUTCH AND ENERGIZING MEANS

Kenneth C. Harlan, Indianapolis, Ind., assignor to The Marquette Metal Products Company, Cleveland, Ohio, a corporation of Ohio Application February 3, 1950, Serial No. 142,141

10 Claims. (Cl. 192—41)

The invention relates to an improved energizing means for the helical friction spring elements of spring clutches, thereby indicating the general object.

Another object is to provide a simple yet efficient and easily operated selective energizing and deenergizing means for the helical spring of a spring clutch wherein an actuator for determining the two indicated conditions makes contact only with rigid or non-yielding members of the clutch arranged to serve efficiently to support and guide the actuator for easy movement while also guarding the spring against damage under practically all conditions of use of the clutch.

More specifically, an object is to provide an energizing means for a clutch spring, said means acting frictionally between two relatively rotatable members of equal diameter one operatingly connected to an energizing end coil of the spring and the other being attached to or forming an integral part of a main torque transmitting element of the clutch whereby the input and output elements of the clutch can be easily and effectually coupled and uncoupled without having to impose any axial thrust on the clutch spring or other force tending to crowd, stretch or distort the coils or interfere with their necessary freedom of movement or with their proper lubrication.

An important object is to provide a clutch spring energizing and deenergizing device of the type just outlined wherein, during torque transmission by the clutch the desired energizing force is maintained on the clutch spring notwithstanding torsional vibrations or pulsations so applied as to tend intermittently or spasmodically to deenergize the spring and cause it to creep, hence to result in undue wear of the clutch spring or the drum surface engaged thereby.

Other objects and features of the invention will become apparent from the following description of the preferred or illustrative forms.

In the drawing, Fig. 1 is a side elevation partly in axial central section showing a typical spring clutch assembly with the improved energizing means applied thereto, said means being shown in section (at top of view) in spring energizing position and in elevation (below) in an inactive or idle position.

Figure 1:
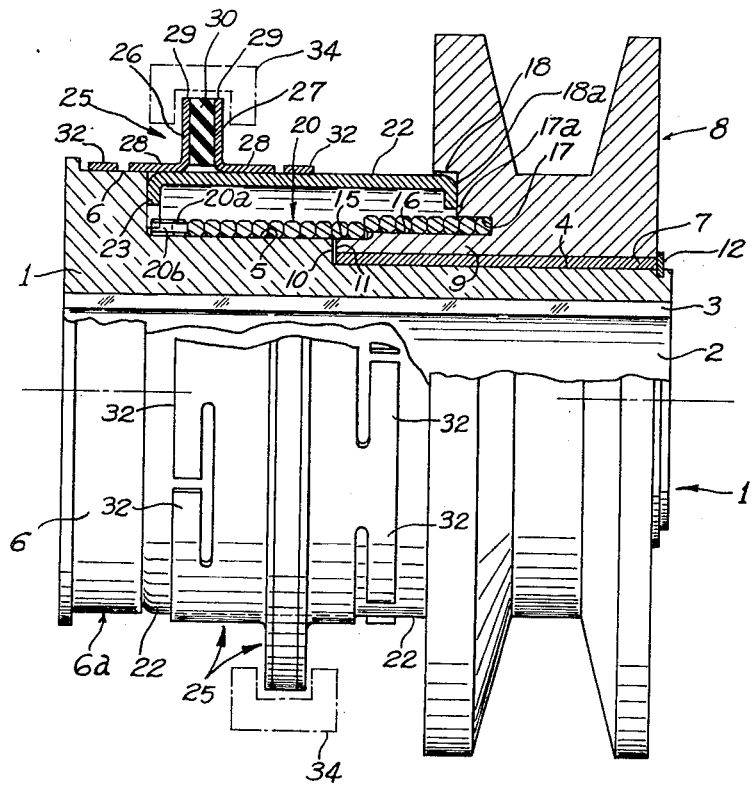

In Fig. 1 a tubular part 1 comprises an adapter for a driving or driven shaft (not shown) into the bore 2 of which adapter such shaft may extend any desired distance and be secured for torque transmission in any suitable manner (keyway shown at 3). The adapter 1 may be formed on three principal diameters indicated by surfaces 4, 5 and 6. Surface 5 forms a clutch drum. Surface 4 rotatably supports, as through a journal bearing bushing 7, a wheel 8 in the form of a V grooved pulley. Surface 6, on end flange 6a, is a friction drum surface for cooperation with part of subject energizing or actuating means described later. The pulley 8 is prevented from undue axial movement by normally slightly spaced clutch-spring-crossover shoulders 10 and 11 on the adapter 1 and said hub, in cooperation with a snap ring 12 overlying the exposed face of the pulley and conventionally seated in a peripheral groove of the adapter.

The hub portion 9 of the pulley 8 has a clutch drum surface 15 of the same diameter as clutch drum surface 5 of the adapter and a slightly enlarged diameter drum surface 16 of the pulley hub is extended into an axial groove 17 at the inner face of the pulley. Outwardly from the groove 17 the pulley has an internally formed surface 18 concentric with the groove 17 and defining in part an enlarged axially open circular channel concentric with the groove and the various drum surfaces.

The helical clutching element or clutch spring 20 has a series of anchoring coils at its right hand end formed approximately to mate the drum surface 16. Two or more of those coils extend into the groove 17 for positive anchorage of the spring to the pulley. The end coils shown as occupying the groove 17 may be tightly staked therein as at 17a. The coils at the left hand or free end of the clutch spring 20 normally (i. e. when relaxed) loosely surround the drum surfaces 5 and 15 so that in the idle condition of the clutch the spring has no drag on the drum 5. An energizing free end coil 20a of the spring has an axially extending toe 20b as a suitable form of anchorage to a semi-floating energizer sleeve 22. An inturned flange 23 of the energizing sleeve is slotted to receive toe 20b, said flange having free turning supporting engagement with the drum 5. The opposite end of the sleeve 22 extends into the channel defined in part by internal pulley surface 18 and has a free bearing on said surface. The end wall 18a of the channel and the flange 6a limit endwise movement of the sleeve. The right hand end of the sleeve 22 may be flanged inwardly to form in cooperation with flange 23 of the sleeve a retaining pocket or reservoir for grease. The outer diameter of the sleeve 22 is the same as surface 6 of adapter flange 6a.

Energizing of the clutch spring for coupling the pulley 8 to the adapter 1 and uncoupling those members (assuming one is constantly rotating and the other is coupled with a load) may be accomplished by any suitable interruptable torque transmitting connection between the sleeve 22 and adapter flange 6a. To effect such connection in the form of device shown by Fig. 1, an actuator ring assembly 25 is provided which is normally supported (as shown at the lower part of Fig. 1) for easy sliding movement on the external surface of the energizer sleeve 22. The assembly 25 preferably comprises a pair of interconnected identical high carbon steel or other spring metal rings 26 and 27 of "angle" section each having an axially extending flange 28 and a radially extending flange 29.

When the clutch is apt to be subjected to torsional vibrations the flanges 29 of actuator ring sections 26 and 27 are connected by an elastic means shown in the preferred form of a rubber or elastomer ring 30 or series of spaced blocks. The ring or such blocks may be secured to the flanges 29 as by bonding or otherwise so that each individual ring section 26 and 27 can turn relative to the other the necessary distances as elastically restrained by the element or elements 30. Only the relatively opposite marginal portions of the axial flanges 28 bear against the energizer sleeve 22, the arrangement for this purpose preferably being the formation of spring tongues or fingers 32 on the marginal portions of the flanges 28. The tongues are distorted inwardly toward the clutch axis sufficiently to provide the desired preloading for frictionally connecting the adapter flange 6a to the energizer sleeve 22. The amount of preloading and gage of spring stock (tongues 32) usually depends on the inherent stiffness of the clutch spring.

For shifting the actuator ring assembly 25 from its idle position to its active position (latter illustrated at the top of Fig. 1) any suitable shipper fork or ring device can be used, diametrally opposite conventional (e. g. slotted button) elements of such device being indicated at 34.

Assuming adapter 1 is the input element of the clutch and is constantly rotating, the pulley 8 will be stationary until the actuator ring assembly has been shifted to the left, frictionally coupling the adapter flange 6a and energizer sleeve through the intermediary of the spring tongues 32. Thereupon the actuator ring assembly 25 causes the energizer sleeve, through its slot and toe connection with the clutch spring 20, successively to contract the coils of the spring from left toward right against the drum surfaces 5 and 15. Shifting of the actuator ring assembly 25 to its right hand illustrated position (bottom of view) enables the clutch spring to expand into relaxed condition clearing the drum surfaces 5 and 15 and allowing the pulley 8 to cease rotating.

If, for example, during operation of the clutch the adapter 1 is being driven by a cyclically pulsating prime mover such as an internal combustion engine or if for any reason input torsional vibrations or surges are imparted to the adapter 1 the elastic ring element 30 takes up the necessary slack in the actuator ring assembly 25 to maintain energizing torque in the proper direction on the free end coils of the spring and insure continued contraction of the various coils against the drum surfaces 5 and 15. Thereby the clutch spring is never allowed to creep or chatter on the drum surfaces.

The same action as just described occurs in case the pulley 8 is the input element of the clutch and is subjected to torque pulsations or vibrations. In that case the energizing reactance is imparted by the load through adapter flange 6a to the left hand actuator ring section 26 and the elastic element 30 prevents spasmodic or intermittent loss of the necessary energizing coupling force between the adapter flange and sleeve 22. Obviously torsional vibrations of the output element if transmitted from the load to the clutch are also prevented from spasmodically disengaging or partially disengaging the clutching coils of the spring.

The non-metallic elastic torque transmitting connection such as 30 between the actuator ring sections 26 and 27 is usually preferred mainly because the material (e. g. rubber) has no characteristic or inherent period of vibration such as could become synchronized with the torsional vibrations discussed.

It should be noted that, with the arrangement described above, the energizer sleeve 22 can impart substantially only torque to the clutch spring, thereby minimizing any tendency for the clutch spring to be moved axially, e. g. stretched or crowded, during energization, deenergization and continued operation.

If the right hand coils of the clutch spring 20 were to be tightly preloaded on the drum surface 16 and the drum portion 15 as desirable is of smaller diameter than 16 (i. e. so as to be the same diameter as surface 5) the spring would try to creep axially to the left or climb down off the surface 16 onto the smaller diameter surface 15. The easy slip fit connection between the right hand coils of the clutch spring and the relatively large drum surface 16 avoids likelihood of such axial creepage and thereby tends to insure that the spring will not be thereby pulled out of the groove 17.

Figure 2A:
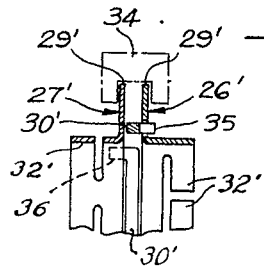
Fig. 2 is an end view of an energizer ring assembly of modified form, Fig. 2a being a fragmentary sectional view thereof as indicated on Fig. 2.
Figure 2:
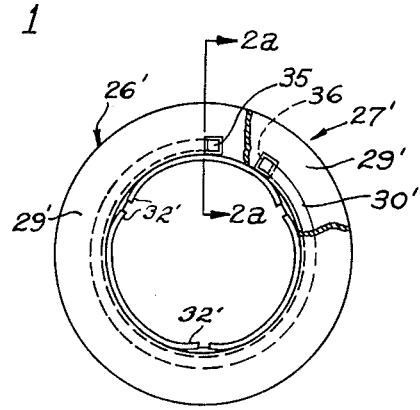

Referring to Figs. 2 and 2a, these are intended to show substantially the same arrangement of spring metal actuator ring sections previously referred to as 26 and 27, counterparts being indicated 26' and 27'. Instead of the elastic non-metallic coupling element or elements 30 however, a single turn metal wire torque spring 30' is used, the opposite ends of which have oppositely turned toe portions 35 and 36 in suitable slots of the respective radial flanges 29'. The spring 30' operates through a relatively large range of angular deflections to take up slack (as already discussed) in transmitting pulsating torque through the clutch. The spring 30' is of course designed to have more than ample torque capacity to cause energizing contraction of the clutch spring.

Figure 3:
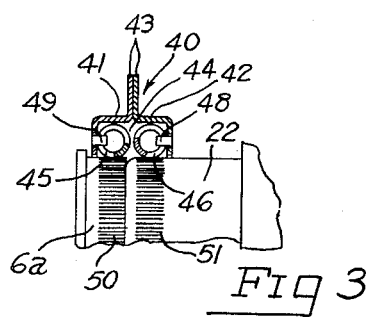
Fig. 3 is a fragmentary sectional assembly view showing the essential energizer parts of another modified form.

The modification shown by Fig. 3 comprises an actuator ring assembly 40 consisting of two identical but reversely positioned sheet metal stampings 41 and 42 surrounding the clutch assembly and secured together at overlapping flanges 43 (e. g. welded together). Within the peripheral channel 44 provided by the arrangement just described are two annular springs 45 and 46 of the so-called "garter spring" type. The garter springs have as usual intertwined or otherwise interconnected opposite ends so that each spring is self-sustaining in annular form and mean diameter.

The garter springs 45 and 46 are so designed as to contract to provide sufficient energizing forces on the energizer sleeve 22 and adapter flange 6a thereby to produce the same clutch-spring-energizing action as previously described. In order to prevent inter-meshing of the two garter springs they are preferably oppositely wound and they may be prevented from turning relative to each other about the main clutch axis by lanced out lugs or nibs as at 48 and 49, one or two nibs for each spring being sufficient. In order to increase the necessary friction force on the energizing sleeve 22 and adapter flange 6a those two parts may be knurled as indicated at 50 and 51. The pitch and depth of the knurls may be so selected that the individual coils of the garter springs can seat into respective knurl grooves.

In operation the individual coils of the garter springs 45 and 46 are displaced out of their normal approximately radial positions into tangential positions in order to enable the torsional taking up of slack during such pulsating driving or load impulses as referred to in connection with Fig. 1.

I claim:

1. A spring clutch comprising two relatively rotatable coaxial members, one having a circular clutch drum and the other having a helical clutch spring torque-connected therewith at one end, said spring being normally disconnected from the clutch drum, an energizing drum member connected with an opposite energizing free end of the spring and freely turnably mounted on one of said coaxial members, an energizing drum member connected to turn with the clutch drum, and an actuating ring telescoping one of said energizing drum members axially slidable thereon and always in torque transmitting relation thereto, said ring having spring friction means engageable frictionally with the other energizing drum member to exert energizing torque on the clutch spring consequent upon relative turning of said coaxial members in one direction.

2. A spring clutch according to claim 1 wherein said actuator ring has separate angularly relatively movable parts at its opposite ends axially of the clutch connected by torsionally yieldable elastic means to absorb slack and thereby maintain energizing torque on the clutch spring when the clutch is subjected to torsional vibrations and surges as described.

3. A spring clutch according to claim 2 wherein the torsionally yieldable means is of rubber or elastomer.

4. A spring clutch according to claim 2 wherein the torsionally yieldable means is a metal spring arranged to enable considerable angular relative movement of the actuator ring parts.

5. In a spring clutch having coaxial relatively rotatable input and output members and a helical clutch spring connected to turn with one member and to be contracted into gripping relation to a clutch drum surface of the other, an energizing means for the spring, said means comprising a sleeve positioned loosely around the spring and secured to an energizing end portion of the spring to turn therewith, said sleeve being supported on one of said input and output members for free angular movement relative to both, and an actuator ring slidable on the sleeve connected to turn therewith and having spring friction means at one end, said actuator ring being movable from an inactive position in contact with only the sleeve to an active position wherein the spring friction means is or are in frictional torque transmitting engagement with a generally circular surface of said member having the drum surface.

6. In a spring clutch having coaxial relatively rotatable input and output members and a helical clutch spring connected to turn with one member and to be moved radially into gripping relation to a clutch drum surface of the other, an energizing means for the spring, said means comprising a sleeve secured to an energizing end portion of the spring to turn therewith and supported for free angular movement relative to said members, and an actuator ring slidable on the sleeve and having circumferentially spaced spring tongues, one set at each end of the ring, said ring being movable from an inactive position in contact with only the sleeve to an active position wherein the tongues of one set are in spring frictional engagement with the sleeve and those of the other set are in spring frictional engagement with a generally circular surface of said member having the drum surface.

7. In a spring clutch unit having coaxial input and output members one supported by the other to turn relative thereto and a helical clutch spring connected to turn with one member and to be contracted into gripping relation to a clutch drum surface of the other, an energizing means for the spring, said means comprising a sleeve secured to an energizing end portion of the spring to turn therewith and supported for free angular movement at one end on and about said drum surface and at the other in an internal channel in the member with which the spring is connected to turn, and a ring slidable on the sleeve coupled to turn therewith and having spring friction means at one end, said ring being movable from an inactive position in contact with only the sleeve to an active position wherein the friction means are in torque transmitting frictional engagement with a generally circular surface of said member having the drum surface.

8. In a spring clutch having coaxial relatively rotatable input and output members, one having a drum surface and the other having a clutch spring connected thereto for rotation therewith, said spring being adapted and arranged to be energized from its free end into gripping contact with the drum surface, torque transmitting means arranged to connect said free end of the clutch spring with said member which has the drum surface for enabling relative movement of said members in one direction to cause the spring to grip the drum surface, said torque transmitting means including angularly relatively movable parts for torque transmitting association with said opposite end of the spring and said member which has the drum surface, and an elastic torque transmitting element connecting said parts and arranged to store energy therebetween and maintain the clutch spring in gripping condition notwithstanding that one of the members is subjected to torsional vibrations or cyclically repeated torsional jerks of predetermined magnitude.

9. A spring clutch according to claim 8 wherein said two parts are rings with spring tongues for frictional connection to energizing drum surfaces connected respectively with said end of the spring and said member which has the drum surface, and the elastic element is of rubber or elastomer so as to have no inherent period of vibration.

10. A spring clutch comprising coaxial input and output members, one having a clutch drum surface, a helical clutch spring torque-connected with the other member and having coils adapted to grip and release the drum surface, relatively angularly movable energizing generally circular friction surface supporting members connected respectively to the energizing end portion of the clutch spring and said member which has the clutch drum surface, a pair of laterally interconnected garter type springs side by side and adapted to be self-gripping on respective circular friction surface members, and a common supporting carrier for the garter type springs shiftable axially of the clutch yieldably to connect said circular friction surface members for co-rotation.

KENNETH C. HARLAN.

REFERENCES CITED

The following references are of record in the file of this patent:

UNITED STATES PATENTS

| Number | Name | Date |
| --- | --- | --- |
| 1,501,978 | Webb | July 22, 1924 |
| 2,001,120 | Brase | May 14, 1935 |